(12) United States Patent
Yuan et al.

(10) Patent No.: US 10,798,364 B2
(45) Date of Patent: Oct. 6, 2020

(54) 3D IMAGE RECONSTRUCTION BASED ON LENSLESS COMPRESSIVE IMAGE ACQUISITION

(71) Applicants: Xin Yuan, Summit, NJ (US); Hong Jiang, Warren, NJ (US); Gang Huang, Monroe Township, NJ (US); Paul A. Wilford, Bernardsville, NJ (US)

(72) Inventors: Xin Yuan, Summit, NJ (US); Hong Jiang, Warren, NJ (US); Gang Huang, Monroe Township, NJ (US); Paul A. Wilford, Bernardsville, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 388 days.

(21) Appl. No.: 15/298,580

(22) Filed: Oct. 20, 2016

(65) Prior Publication Data
US 2018/0115766 A1    Apr. 26, 2018

(51) Int. Cl.
*H04N 13/20*   (2018.01)
*G06T 7/50*    (2017.01)
(Continued)

(52) U.S. Cl.
CPC ............... *H04N 13/20* (2018.05); *G06T 7/50* (2017.01); *H04N 5/2226* (2013.01);
(Continued)

(58) Field of Classification Search
CPC ...... G06K 9/6201; G06T 7/50; H04N 13/128; H04N 13/20; H04N 2013/0081
(Continued)

(56) References Cited

U.S. PATENT DOCUMENTS

| 3,712,199 A * | 1/1973 | Songer, Jr. ......... G02B 27/2207 352/60 |
| 8,125,559 B2 * | 2/2012 | Ludwig ................. H04N 5/225 348/241 |

(Continued)

OTHER PUBLICATIONS

Jiang et al., "Lensless Imaging by Compressive Sensing," IEEE International Conferences on Image Processing. vol. 3, No. 15 2014, pp. 1-10. (Year: 2014).*

(Continued)

*Primary Examiner* — Nasim N Nirjhar
(74) *Attorney, Agent, or Firm* — Tong, Rea, Bentley & Kim, LLC

(57) ABSTRACT

The present disclosure generally discloses a three-dimensional (3D) image reconstruction capability. The 3D image reconstruction capability may be configured to support reconstruction of a 3D image of a scene. The 3D image reconstruction capability may be configured to support reconstruction of a 3D image of a scene based on lensless compressive image acquisition performed using a lensless compressive camera having a single aperture and a set of multiple sensors. The reconstructed 3D image of a scene may include (1) image data indicative of a set of multiple two-dimensional (2D) images reconstructed based on the set of multiple sensors of the lensless compressive camera (which may be represented as images) and (2) depth information indicative of depths at points or areas of an overlapping portion of the multiple images reconstructed based on the set of multiple sensors of the lensless compressive camera (which may be represented as a depth map).

17 Claims, 8 Drawing Sheets

(51) Int. Cl.
| | |
|---|---|
| *H04N 13/128* | (2018.01) |
| *H04N 13/254* | (2018.01) |
| *H04N 5/222* | (2006.01) |
| *H04N 13/243* | (2018.01) |
| *H04N 13/271* | (2018.01) |
| *H04N 5/225* | (2006.01) |
| *H04N 13/00* | (2018.01) |

(52) U.S. Cl.
CPC ......... *H04N 5/2254* (2013.01); *H04N 5/2258* (2013.01); *H04N 13/128* (2018.05); *H04N 13/243* (2018.05); *H04N 13/254* (2018.05); *H04N 13/271* (2018.05); *H04N 2013/0081* (2013.01)

(58) Field of Classification Search
USPC .......................................................... 348/46
See application file for complete search history.

(56) References Cited

U.S. PATENT DOCUMENTS

| | | | | |
|---|---|---|---|---|
| 8,884,899 | B2* | 11/2014 | Luo .................... | G02B 27/0093 345/173 |
| 9,521,395 | B2* | 12/2016 | Shintani ............... | H04N 13/239 |
| 9,605,941 | B2* | 3/2017 | Ozcan ................ | G01N 21/4795 |
| 2007/0081200 | A1* | 4/2007 | Zomet ..................... | H04N 1/04 358/484 |
| 2011/0292178 | A1* | 12/2011 | Goma .................. | H04N 13/128 348/46 |
| 2012/0327197 | A1* | 12/2012 | Yamashita ............. | G03B 35/18 348/50 |
| 2013/0201297 | A1* | 8/2013 | Jiang ...................... | H04N 5/335 348/49 |
| 2013/0250062 | A1* | 9/2013 | Tin ............................ | G06T 7/85 348/46 |
| 2015/0382000 | A1* | 12/2015 | Jiang .................... | H04N 19/169 382/233 |
| 2017/0109889 | A1* | 4/2017 | Yun ......................... | G06T 7/593 |
| 2017/0135583 | A1* | 5/2017 | Blodgett .............. | A61B 5/0066 |
| 2018/0165823 | A1* | 6/2018 | Ludwig .................. | G06T 7/557 |

OTHER PUBLICATIONS

Jiang (Multi-view in lensless compressive imaging—Received May 30, 2014; Revised Nov. 10, 2014; Accepted Nov. 11, 2014, SIP (2014), vol. 3, e15, doi:10.1017/ATSIP.2014.16) (Year: 2014).*

Vivek (Lensless Imaging—A computational renaissance—Digital Object Identifier 10.1109/MSP.2016.2581921—Date of publication: Sep. 2, 2016—IEEE Signal Processing Magazine | Sep. 2016) (Year: 2016).*

Huang, et al., "Lensless Imaging by Compressive Sensing," 20th IEEE International Conferences on Image Processing (ICIP), Sep. 15-18, 2013, pp. 1-5.

Jiang, et al., "Multi-view in Lensless Compressive Imaging," APSIPA Transaction on Signal and Information Processing, vol. 3, No. 15, 2014, pp. 1-10.

Carr, et al., "Reconstruction and Representation of 3D Objects with Radial Basis Functions," Proceeding of the 28th Conference on Computer Graphics and Interactive Techniques (SIGGRAPH'01), 2001, pp. 67-76.

Niessner, et al., "Real-time 3D Reconstruction at Scale Using Voxel Hashing," ACM Trans, Graph, vol. 32, No. 6, Nov. 2013, pp. 169:1-169:11.

Peleg, et al., "Omnistereo: Panoramic Stereo Imaging," IEEE Transactions on Pattern Analysis and Machine Intelligence, vol. 23, No. 3, Mar. 2001, pp. 279-290.

Yuan, et al., "Compressive Temporal Stereo-Vision Imaging," Computational Optical Sensing and Imaging (COSI), Jul. 25-28, 2016.

Watanabe, et al., "Rational Filters for Passive Depth from Defocus," International Journal on Computer Vision, vol. 27, No. 3, May 1998, pp. 203-225.

Llull, et al., "Image Translation for Single-shot Focal Tomography," Optica, vol. 2, No. 9, 2015, pp. 822-825.

Saxena et al., "3-D Depth Reconstruction from a Single Still Image," International Journal of Computer Vision, vol. 76, No. 1, Jan. 2008, pp. 53-69.

Yuan, et al., "Compressive Sensing Via Low-rank Gaussian Mixture Models," arXiv:1508.06901, Aug. 27, 2015, pp. 1-12.

Yuan, "Generalized Alternating Projection Based Total Variation Minimization for Compressive Sensing," International Conference on Image Processing (ICIP), Sep. 25-28, 2016.

Jain et al., "Machine Vision: Chapter 11," McGraw Hill, New York, 1995.

* cited by examiner

FIG. 5
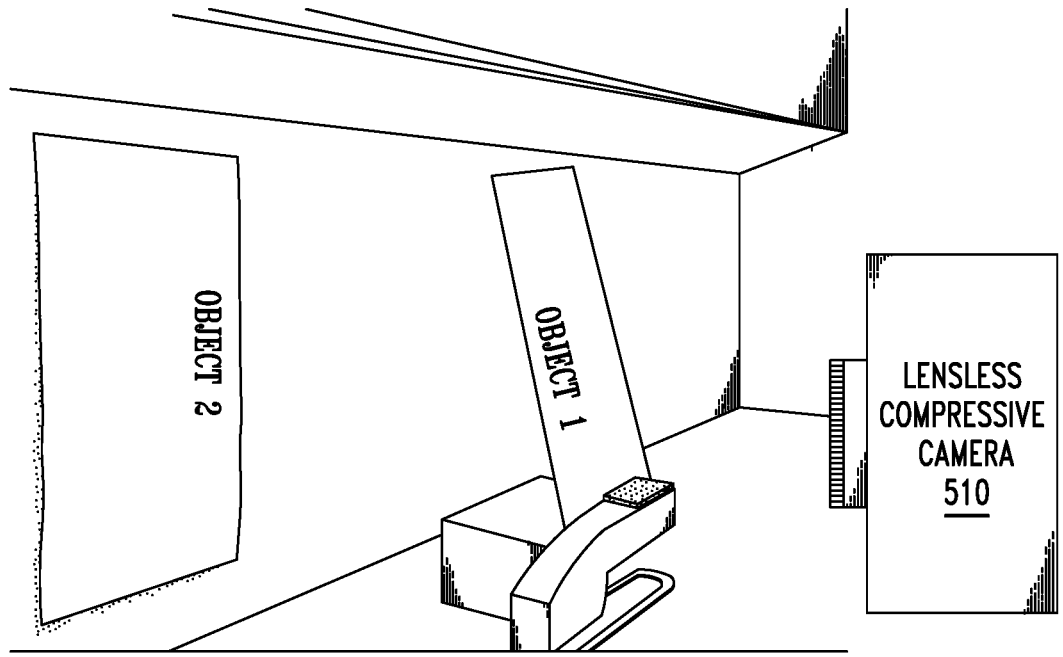
FIG. 6
FIRST RECONSTRUCTED IMAGE
610-1
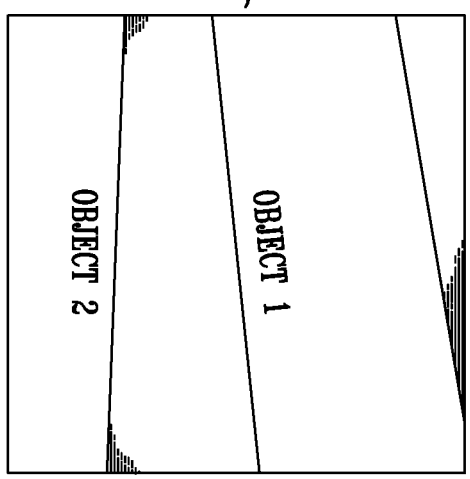
SECOND RECONSTRUCTED IMAGE
610-2
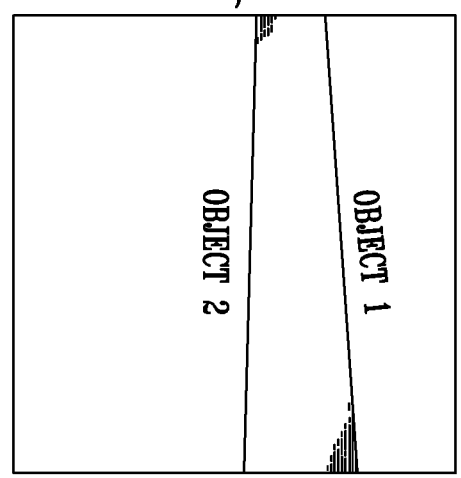

3D IMAGE RECONSTRUCTION BASED ON LENSLESS COMPRESSIVE IMAGE ACQUISITION

TECHNICAL FIELD

The present disclosure relates generally to image reconstruction and, more particularly but not exclusively, to image reconstruction based on lensless compressive image acquisition.

BACKGROUND

Image acquisition, as performed by contemporary digital image or video systems, generally involves the acquisition and immediate compression of large amounts of raw image or video data. Lensless compressive image acquisition may be used to improve image acquisition based on collection of compressive measurements. Image reconstruction may then be performed to reconstruct images based on the compressive measurements.

SUMMARY

The present disclosure generally discloses three-dimensional (3D) image reconstruction capabilities.

In at least some embodiments, an apparatus is provided. The apparatus includes a processor and a memory communicatively connected to the processor. The processor is configured to receive camera geometry information associated with a lensless compressive camera including a programmable aperture and a pair of sensors. The processor is configured to obtain reconstructed image data indicative of a pair of reconstructed images reconstructed based on respective sets of compressive measurements associated with the respective pair of sensors of the lensless compressive camera. The processor is configured to determine, based on the camera geometry information and the reconstructed image data, depth information associated with a common image portion that is common to the pair of reconstructed images.

In at least some embodiments, a method is provided. The method includes receiving, by a processor, camera geometry information associated with a lensless compressive camera including a programmable aperture and a pair of sensors. The method includes obtaining, by the processor, reconstructed image data indicative of a pair of reconstructed images reconstructed based on respective sets of compressive measurements associated with the respective pair of sensors of the lensless compressive camera. The method includes determining, by the processor based on the camera geometry information and the reconstructed image data, depth information associated with a common image portion that is common to the pair of reconstructed images.

In at least some embodiments, a lensless compressive camera is provided. The lensless compressive camera includes a programmable aperture and a pair of sensors configured to detect light passing through the programmable aperture. The lensless compressive camera includes a memory configured to store camera geometry information associated with the lensless compressive camera. The lensless compressive camera includes a processor. The processor is configured to determine reconstructed image data indicative of a pair of reconstructed images reconstructed based on respective sets of compressive measurements associated with the respective pair of sensors of the lensless compressive camera. The processor is configured to determine, based on the camera geometry information and the reconstructed image data, depth information associated with a common image portion that is common to the pair of reconstructed images.

BRIEF DESCRIPTION OF THE DRAWINGS

The teachings herein can be readily understood by considering the following detailed description in conjunction with the accompanying drawings, in which:

FIG. 5 depicts a lensless compressive camera and a scene to be captured by the lensless compressive camera for use in generating a reconstructed 3D image of the scene;

FIG. 6 depicts two reconstructed images of the scene of FIG. 5 that are reconstructed by the lensless compressive camera;

To facilitate understanding, identical reference numerals have been used, where possible, to designate identical elements that are common to the figures.

DETAILED DESCRIPTION

The present disclosure generally discloses a three-dimensional (3D) image reconstruction capability. The 3D image reconstruction capability may be configured to support reconstruction of a 3D image of a scene. The 3D image reconstruction capability may be configured to support reconstruction of a 3D image of a scene based on lensless compressive image acquisition performed using a lensless compressive camera having a single aperture and a set of multiple sensors. The reconstructed 3D image of a scene may include (1) image data indicative of a set of multiple two-dimensional (2D) images reconstructed based on the set of multiple sensors of the lensless compressive camera (which may be represented as images) and (2) depth information indicative of depths at points or areas of an overlapping portion of the multiple images reconstructed based on the set of multiple sensors of the lensless compressive camera (which may be represented as a depth map). The image data indicative of the multiple 2D images reconstructed based on the sensors of the lensless compressive camera may be generated based on compressive measurements collected based on the set of multiple sensors of the lensless compressive camera based on light passing through the single aperture of the lensless compressive camera. The multiple 2D images that are reconstructed based on the multiple sensors provide stereo imaging and, thus, may have disparity information associated therewith. The depth information associated with the overlapping portion of the multiple images may be determined based on camera geometry information associated with the lensless compressive camera. The depth information, for each region of the overlapping portion of the multiple images, provides information indicative of a depth of the scene at that region of the overlapping portion of the multiple images. It is noted that, due to the arrangement of the lensless compressive camera having the single aperture and the multiple sensors, the disparity information associated with the overlapping portion of the multiple images is proportional to the depth information associated with the overlapping portion of the multiple images. It will be appreciated that these and various other embodiments and potential advantages of the 3D image reconstruction capability may be further understood by way of reference to the example lensless compressive image acquisition system of FIG. 1.

Figure 1:
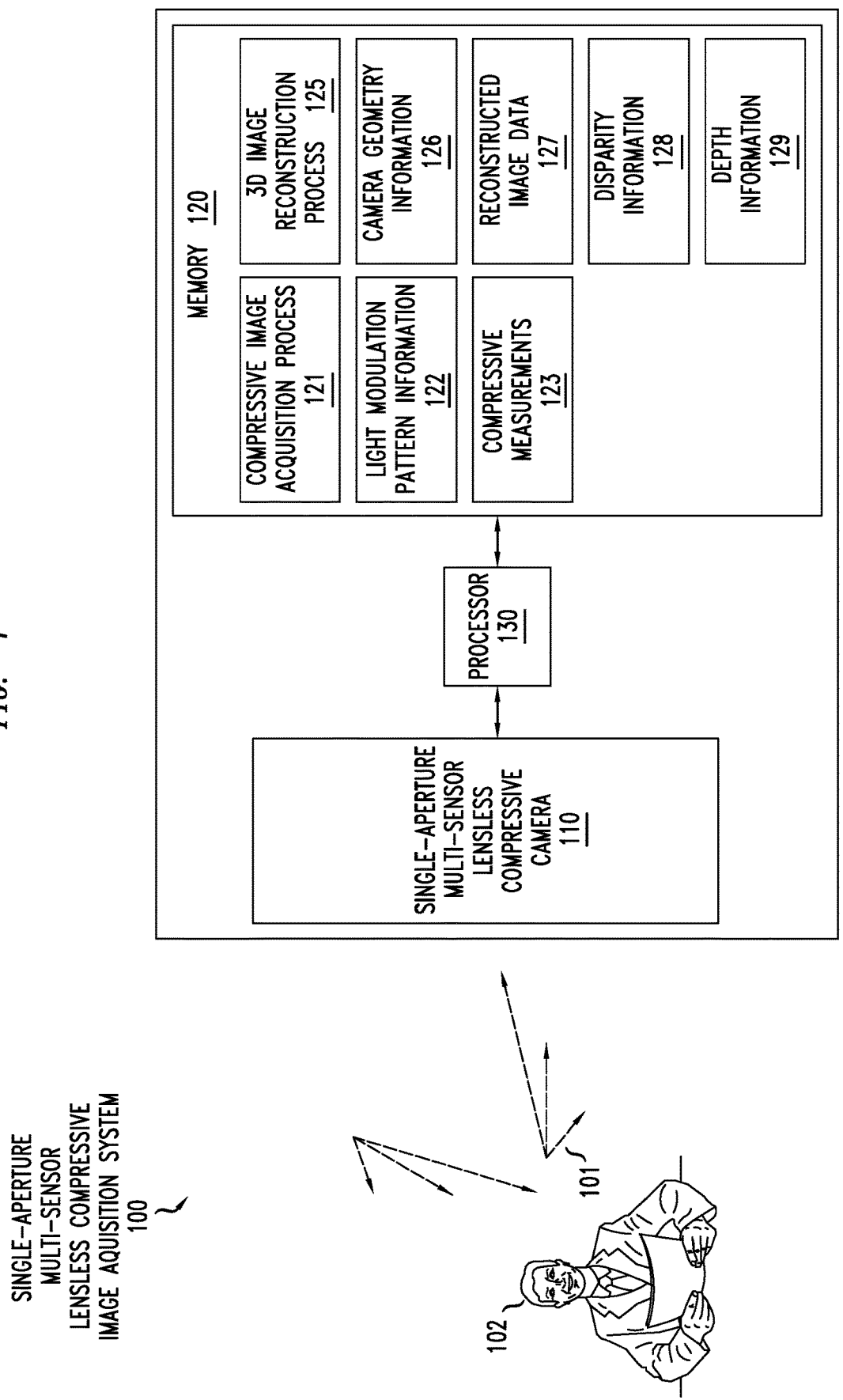
FIG. 1 depicts an example single-aperture multi-sensor lensless compressive image acquisition system configured to support 3D image reconstruction based on lensless compressive image acquisition.

FIG. 1 depicts an example single-aperture multi-sensor lensless compressive image acquisition system configured to support 3D image reconstruction based on lensless compressive image acquisition.

As depicted in FIG. 1, incident light 101 reflecting from an object 102 is received by a single-aperture multi-sensor lensless compressive image acquisition system 100 that is configured to perform compressive image acquisition to capture an image including the object 102.

The single-aperture multi-sensor lensless compressive image acquisition system 100 includes a single-aperture multi-sensor lensless compressive camera 110, a memory 120, and a processor 130. The processor 130 is communicatively connected to the single-aperture multi-sensor lensless compressive camera 110 and the memory 120.

The single-aperture multi-sensor lensless compressive camera 110 is configured to perform compressive sampling for lensless compressive image acquisition. An example single-aperture multi-sensor lensless compressive camera 110 is depicted and described with respect to FIG. 2. It will be appreciated that, although primarily presented with respect to embodiments in which single-aperture multi-sensor lensless compressive camera 110 produces compressive measurements for compressive image acquisition, in at least some embodiments compressive measurements for compressive image acquisition may be produced by an element other than single-aperture multi-sensor lensless compressive camera 110 (e.g., processor 130, a remote element, or the like) based on detector output data produced by single-aperture multi-sensor lensless compressive camera 110 (e.g., detector output data produced by detectors of the single-aperture multi-sensor lensless compressive camera 110).

The memory 120 and processor 130 are configured to cooperate to support the operation of single-aperture multi-sensor lensless compressive camera 110 in performing compressive sampling for compressive image acquisition. The operation of memory 120 and processor 130 in supporting the operation of single-aperture multi-sensor lensless compressive camera 110 in performing compressive sampling for compressive image acquisition may be further understood by way of reference to FIG. 2.

The memory 120 is configured to store information associated with single-aperture multi-sensor lensless compressive image acquisition. The memory 120 is configured to store a compressive image acquisition process 121, which may be executed by processor 130 to control compressive image acquisition using single-aperture multi-sensor lensless compressive camera 110. The memory 120 is configured to store light modulation pattern information 122 (which also may be referred to herein as measurement basis information) for use by the single-aperture multi-sensor lensless compressive camera 110 in performing compressive sampling for compressive image acquisition. The memory 120 is configured to store compressive measurements 123 that are produced by the single-aperture multi-sensor lensless compressive camera 110 while performing compressive sampling for compressive image acquisition. The memory 120 may be configured to store various other types of information related to compressive image acquisition (e.g., input data, processes, output data, or the like, as well as various combinations thereof).

The processor 130 is configured to control the operation of single-aperture multi-sensor lensless compressive camera 110 to perform compressive sampling for compressive image acquisition. The processor 130 may be configured to execute the compressive image acquisition process 121 in order to control compressive image acquisition using single-aperture multi-sensor lensless compressive camera 110. The processor 130 may be configured to provide the light modulation pattern information 122 to the single-aperture multi-sensor lensless compressive camera 110 for use by the single-aperture multi-sensor lensless compressive camera 110 in performing compressive sampling for compressive image acquisition. The processor 130 may be configured to receive the compressive measurements 123 produced by the multi-sensor lensless compressive camera 110 while performing compressive sampling and to control storage of the compressive measurements 123 produced by the multi-sensor lensless compressive camera 110 in the memory 120. The processor 130 may be configured to provide various other processing functions related to lensless compressive image acquisition by single-aperture multi-sensor lensless compressive camera 110.

The memory 120 and processor 130 are configured to cooperate to support 3D image reconstruction processing for reconstructing 3D images of scenes captured by single-aperture multi-sensor lensless compressive camera 110. The operation of memory 120 and processor 130 in supporting the 3D image reconstruction processing for reconstructing 3D images of scenes captured by single-aperture multi-sensor lensless compressive camera 110 may be further understood by way of reference to FIGS. 3-5.

The memory 120 is configured to store information associated with 3D image reconstruction processing for reconstructing 3D images of scenes captured by single-aperture multi-sensor lensless compressive camera 110. The memory 120 is configured to store a 3D image reconstruction process 125, which may be executed by the processor 130 to perform 3D image reconstruction processing based on compressive image acquisition using single-aperture multi-sensor lensless compressive camera 110. The memory 120, as noted above, is configured to store compressive measurements 123 produced by the multi-sensor lensless compressive camera 110 while performing compressive image acquisition, which may be used for 3D image reconstruction processing. The memory 120 is configured to store camera geometry information 126 associated with single-aperture multi-sensor lensless compressive camera 110, which may be used for 3D image reconstruction processing. The memory 120 is configured to store image data 127, which may be produced based on processing of compressive measurements 123 using image reconstruction processing. The memory 120 is configured to store disparity information 128 which may be generated during 3D image reconstruction processing. The memory 120 is configured to store depth information 128 which may be generated during 3D image reconstruction processing. The memory 120 may be configured to store various other types of information related to 3D image reconstruction processing (e.g., input data, processes, output data, or the like, as well as various combinations thereof).

The processor 130 is configured to perform 3D image reconstruction processing. The processor 130 may be configured to execute the 3D image reconstruction process 125 in order to perform 3D image reconstruction processing. The processor 130 may be configured to generate the image data 127 based on two-dimensional (2D) image reconstruction processing of the compressive measurements 123. The processor 130 may be configured to generate the disparity information 128 associated with the image data 127 based on processing of the image data 127 based on the camera geometry information 126 associated with single-aperture multi-sensor lensless compressive camera 110. The processor 130 may be configured to generate the depth information 129 associated with the image data 127 based on processing of the image data 127 based on the camera geometry information 126 associated with single-aperture multi-sensor lensless compressive camera 110, based on processing of the disparity information 128, or the like, as well as various combinations thereof. The processor 130 may be configured to provide various other processing functions related to 3D image reconstruction.

It will be appreciated that single-aperture multi-sensor lensless compressive image acquisition system 100 may be provided within various contexts. For example, single-aperture multi-sensor lensless compressive image acquisition system 100 may form part of a photographic camera, a video camera, a smartphone, a tablet computer, an Internet-of-Things (IoT) device, or the like.

It will be appreciated that, although primarily presented with respect to an embodiment in which the functions of the single-aperture multi-sensor lensless compressive camera 110, the memory 120, and the processor 130 are integrated into a single device or system (illustratively, the single-aperture multi-sensor lensless compressive image acquisition system 100), various functions of the single-aperture multi-sensor lensless compressive camera 110, the memory 120, and the processor 130 may be separated into multiple devices or systems which may be geographically centralized or distributed.

It will be appreciated that, although primarily presented with respect to an embodiment in which the functions of 3D image reconstruction capability are performed by the single-aperture multi-sensor lensless compressive camera 110, the various functions 3D image reconstruction capability may be performed by other devices (e.g., based on compressive measurements or reconstructed images received from the single-aperture multi-sensor lensless compressive camera 110), distributed across multiple devices (which may or may not include single-aperture multi-sensor lensless compressive camera 110), or the like.

Figure 2:
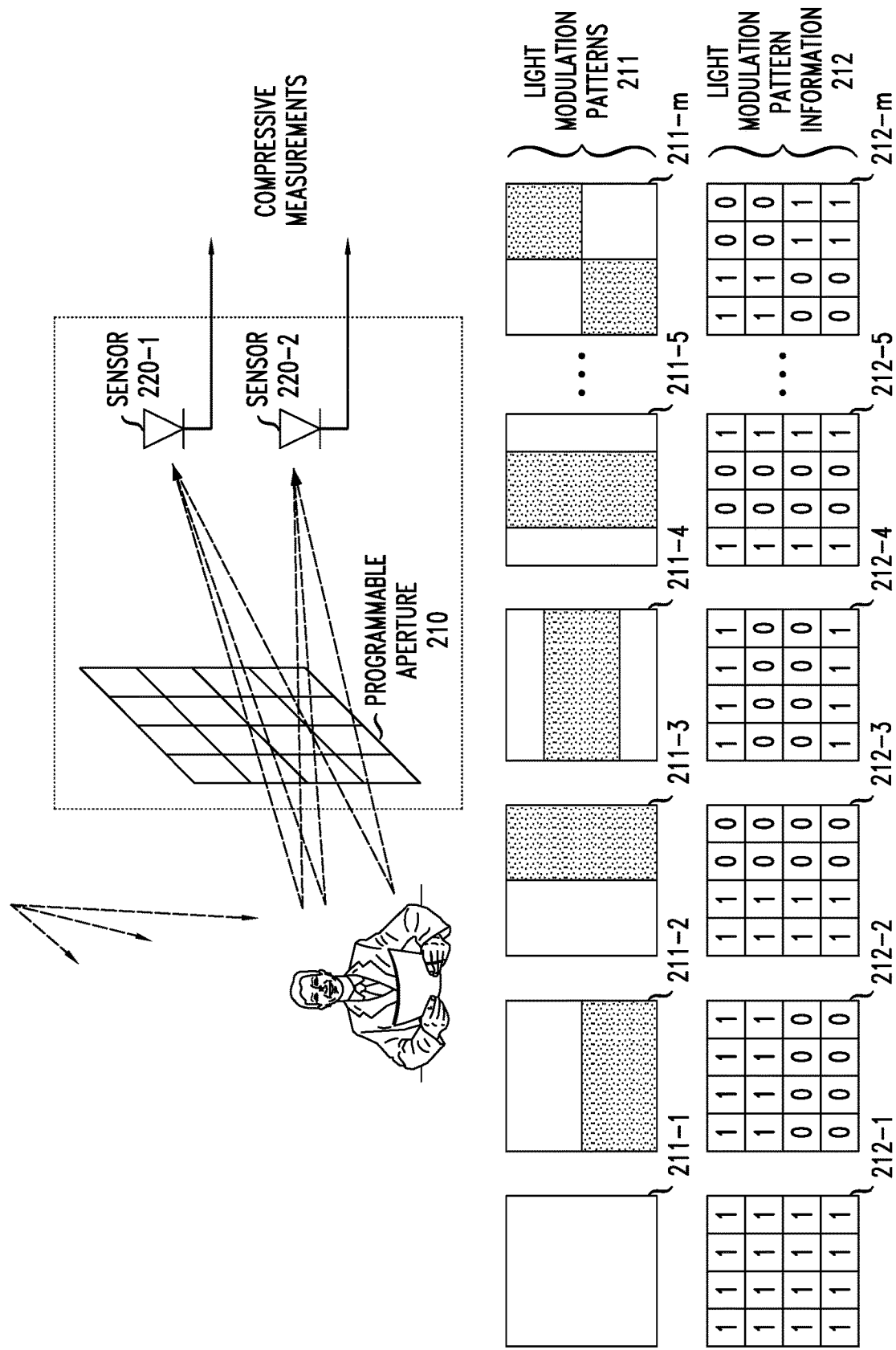
FIG. 2 depicts a single-aperture multi-sensor lensless compressive camera for use in the single-aperture multi-sensor lensless compressive image acquisition system of FIG. 1.

FIG. 2 depicts a single-aperture multi-sensor lensless compressive camera for use in the single-aperture multi-sensor lensless compressive image acquisition system of FIG. 1.

The single-aperture multi-sensor lensless compressive camera 200 includes a programmable aperture 210 and a sensor assembly 220.

The programmable aperture 210 is configured to modulate the passage of light through the programmable aperture 210. The programmable aperture 210 is configured to modulate the amount of light permitted to pass through the programmable aperture 210 and the pattern of light permitted to pass through the programmable aperture 210. The programmable aperture 210 has a fixed aperture size that is larger than a pinhole, but may be relatively small. The programmable aperture 210 has a shape, which may be a shape that is repeatable without gaps. For example, the shape of the programmable aperture 210 may be a square, a rectangle, a rhombus, a parallelogram, or the like. The programmable aperture 210 may be configured to allow the view to be tessellated by translating an identical polygon without gaps while allowing negligible overlapping regions. The programmable aperture 210 has a size, which may depend on various factors (e.g., the distance between the programmable aperture 210 and the sensor assembly 220, the inter-sensor distance between sensors of the sensor assembly 220, or the like, as well as various combinations thereof). The programmable aperture 210 also may be referred to herein as a programmable mask.

The programmable aperture 210 includes an array of programmable elements. The programmable elements of programmable aperture 210 are configured to be individually controlled to permit light to pass therethrough or to prevent light from passing therethrough. The transmittance of each of the programmable elements can be programmable to be a specific value. The transmittance of each of the programmable elements can be programmable to be a specific value using light modulation pattern information. For example, the light modulation pattern information may be in the form of a matrix (or other suitable data structure) having a set of entries corresponding to the programmable elements of the programmable aperture 210, respectively. The entries of the matrix may support binary values, such as where each entry may have a value of 0 (e.g., no transmittance of light through the respective programmable element) or a value of 1 (e.g., full transmittance of light through the respective programmable element). The entries of the matrix may support a range of values (e.g., between 0 and 1, or between any other suitable range of values), such that the value of a given entry is indicative of the amount of transmittance of the programmable element associated with the given entry (e.g., intermediate values give some, but not full, transmittance of light). It will be appreciated that other values may be used to control the programmable elements of programmable aperture 210. The programmable elements of programmable aperture 210 may be controlled electrically (e.g., under the control of a processor or other control element), mechanically (e.g., using a digital micromirror device (DMD) or other suitable device), or the like, as well as various combinations thereof. For example, the programmable aperture 210 may be a transparent liquid crystal display (LCD) device having programmable LCD elements, a transparent liquid crystal on silicon (LCoS) device having programmable LCoS elements, or the like.

The programmable aperture 210, as noted above, includes an array of programmable elements configured to be individually controlled, to permit light to pass therethrough or to prevent light from passing therethrough, based on light modulation pattern information. It is noted that example light modulation patterns 211 produced based on example light modulation pattern information 212 are depicted in FIG. 2. In this example, the programmable aperture 210 is assumed to have sixteen equal-sized, square programmable elements (primarily discussed in an order of top-left to bottom-right proceeding by rows then columns), although it will be appreciated that fewer or more programmable elements may be present, programmable elements may have different shapes, programmable elements may have different sizes, or the like, as well as various combinations thereof. In the first example light modulation pattern 211-1, the entire programmable aperture 210 is modulated to allow light to pass therethrough (illustratively, associated light modulation pattern information 212-1 may be an array of [1, 1, 1, 1, 1, 1, 1, 1, 1, 1, 1, 1, 1, 1, 1, 1]). In the second example light modulation pattern 211-2, the top half of the programmable aperture 210 is modulated to allow light to pass therethrough and the bottom half of the programmable aperture 210 is modulated to prevent light from passing therethrough (associated light modulation pattern information 212-2 may be an array of [1, 1, 1, 1, 1, 1, 1, 1, 0, 0, 0, 0, 0, 0, 0, 0,]). In the third example light modulation pattern 211-3, the left half of the programmable aperture 210 is modulated to allow light to pass therethrough and the right half of the programmable aperture 210 is modulated to prevent light from passing therethrough (illustratively, associated light modulation pattern information 212-3 may be an array of [1, 1, 0, 0, 1, 1, 0, 0, 1, 1, 0, 0, 1, 1, 0, 0]). In the fourth example light modulation pattern 211-4, top and bottom quarters of the programmable aperture 210 are modulated to allow light to pass therethrough and the middle half of the programmable aperture 210 is modulated to allow light to prevent light from passing therethrough (illustratively, associated light modulation pattern information 212-4 may be an array of [1, 1, 1, 1, 0, 0, 0, 0, 0, 0, 0, 0, 1, 1, 1, 1]). In the fifth example light modulation pattern 211-5, the left and right halves of the programmable aperture 210 are modulated to allow light to pass therethrough and the middle half of the programmable aperture 210 is modulated to prevent light from passing therethrough (illustratively, associated light modulation pattern information 212-5 may be an array of [1, 0, 0, 1, 1, 0, 0, 1, 1, 0, 0, 1, 1, 0, 0, 1]). In the m-th example light modulation pattern 211-$m$, top-left and bottom-right quarters of the programmable aperture 210 are modulated to allow light to pass therethrough and bottom-left and top-right quarters of the programmable aperture 210 are modulated to prevent light from passing therethrough (illustratively, associated light modulation pattern information 212-$m$ may be an array of [1, 1, 0, 0, 1, 1, 0, 0, 0, 0, 1, 1, 0, 0, 1, 1]). It will be appreciated that example light modulation patterns 211 represent merely a few of the light modulation patterns which may be applied to the programmable aperture 210 to modulate passage of light through the programmable aperture 210. It will be appreciated that fewer or more sets of light modulation pattern information 212 may be supported and, thus, that fewer or more light modulation patterns 211 may be produced. The m sets of light modulation pattern information 212 may be used to produce m sets of compressive measurements as discussed further below within respect to sensor assembly 220.

The sensor assembly 220 includes a pair of sensors 221-1 and 221-2 (collectively, sensors 221). The sensors 221 are each configured to detect light passing through the programmable aperture 210 and to produce compressive measurements based on the detection of the light passing through the programmable aperture 210. The sensors 221 may each include (1) a detector that is configured to detect light and to produce a detector output based on the detected light and (2) a compressive measurement device configured to produce a compressive measurement based on the detector output of the detector. For example, the detector may be a photon detector and the compressive measurement device may be an analog-to-digital (A/D) converter configured to produce discretized compressive measurements based on the detector output. In general, a sensor 221 is configured to produce a compressive measurement based on detection of light passing through programmable aperture 210 and incident on the sensor 221 based on use of light modulation pattern information 212, respectively. As such, given m sets of light modulation pattern information 212 configured to produce m light modulation patterns 211, each sensor 221 will produce m compressive measurements, respectively. Similarly, but stated differently, use of each set of light modulation pattern information 212-$x$ that is configured to produce a corresponding light modulation pattern 211-$x$ will produce two compressive measurements associated with the two sensors 221-1 and 221-2, respectively. Accordingly, for the sensor assembly 220 including the two sensors 221-1 and 221-2, the use of the m sets of light modulation pattern information 212 that are configured to produce the m light modulation patterns 211 will result in (1) m total compressive measurements, captured by the sensor 221-1, which may be processed to reconstruct a first image captured by the sensor 221-1 of the single-aperture multi-sensor lensless compressive camera 200 and (2) m total compressive measurements, captured by the sensor 221-2, which may be processed to reconstruct a second image captured by the sensor 221-2 of the single-aperture multi-sensor lensless compressive camera 200. It is noted that, although primarily presented with respect to embodiments in which the sensors 221 produce compressive measurements for compressive image acquisition, in at least some embodiments the compressive measurements for compressive image acquisition may be produced by an element other than sensors 221 (e.g., a processor or other controller which receives the detector outputs from the sensors 221 where the sensors 221 include photon detectors but not compressive measurement devices such as A/D converters).

The single-aperture multi-sensor lensless compressive camera 200, as depicted in FIG. 2 and discussed hereinabove, may generate two sets of compressive measurements associated with the two sensors 221 based on light passing through the programmable aperture 210 that is incident on the two sensors 221. The two sets of compressive measurements may be processed in order to reconstruct two 2D images which provide two different views of the scene. The two 2D images of the scene, which provide two different views of the scene, may be further processed in order to determine a 3D reconstruction of the scene. The 3D reconstruction of the scene may be composed of the two 2D images of the scene and depth information associated with the two 2D images of the scene. The processing of two 2D images of a scene, in order to determine a 3D reconstruction of the scene that is composed of the two 2D images of the scene and the depth information associated with the two 2D images of the scene, may be further understood by considering a geometrical analysis of a single-aperture multi-sensor lensless compressive camera, as presented with respect to FIG. 3.

Figure 3:
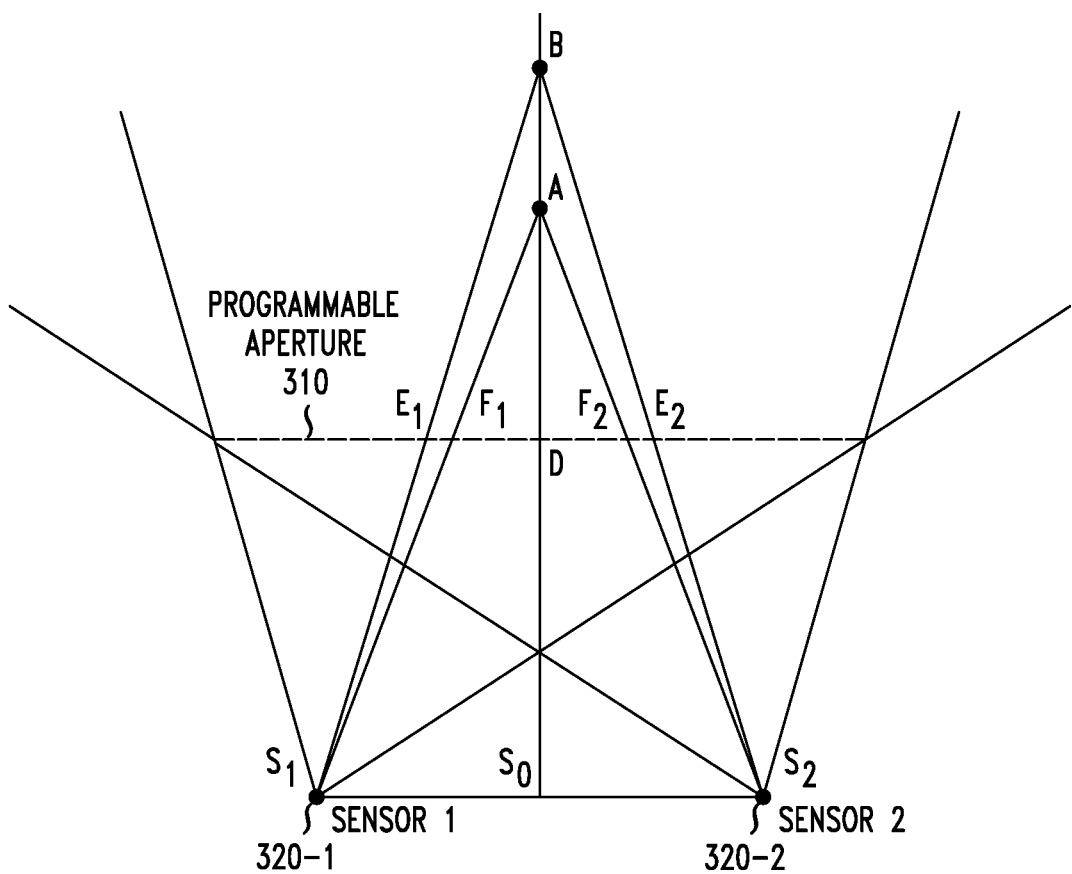
FIG. 3 depicts a geometrical analysis of lensless compressive stereo imaging based on the single-aperture multi-sensor lensless compressive camera of FIG. 2.

FIG. 3 depicts a geometrical analysis of lensless compressive stereo imaging based on the single-aperture multi-sensor lensless compressive camera of FIG. 2.

The single-aperture multi-sensor lensless compressive camera 300 includes a programmable aperture 310 (represented by the dashed line) and a pair of sensors 320 including a first sensor 320-1 (also denoted as Sensor 1) and a second sensor 320-2 (also denoted as Sensor 2) which share the programmable aperture 310.

The single-aperture multi-sensor lensless compressive camera 300 has a camera geometry associated therewith, in terms of the arrangements of the sensors 320 with respect to the programmable aperture 310 and the arrangements of the sensors 320 with respect to each other. The two sensors 320 are placed on a sensor plane associated with the programmable aperture 310 (e.g., the aperture and sensor plane may be separate assemblies or may form part of one assembly). The two sensors 320 are non-collocated, such that they are at different positions on the sensor plane (which are denoted as point $S_1$ for Sensor 1 and point $S_2$ for Sensor 2). The point S0 is a reference point on the sensor plane. The view angles of the first sensor 320-1 are indicated by the lines emanating from the first sensor 320-1 and the view angles of the second sensor 320-1 are indicated by the lines emanating from the second sensor 320-1. The camera geometry of single-aperture multi-sensor lensless compressive camera 300 is discussed further below within the context of determining depth information for a 3D reconstruction of a real scene $I_0$ to be captured by the single-aperture multi-sensor lensless compressive camera 300.

The single-aperture multi-sensor lensless compressive camera 300, given the real scene $I_0$, measures the real scene in two different views based on the two sensors 320. The real scene $I_0$ is measured by the two sensors 320 based on the same aperture pattern. The two sensors 320-1 and 320-2 have different views of the real scene $I_0$ and, thus, capture two different scenes (denoted as scene $I_1$ for sensor 320-1 and scene $I_2$ for sensor 320-2). It will be appreciated that, while the scenes $I_1$ and $I_2$ captured by sensors 320-1 and 320-2 are different, parts of the real scene $I_0$ are in a common view that is common to sensors 320-1 and 320-2 and, there is overlap between scenes $I_1$ and $I_2$ captured by sensors 320-1 and 320-2. Under the compressive sensing model, compressive measurements captured by sensors 320-1 and 320-2 for scenes $I_1$ and $I_2$, respectively, may be determined as: (1) $y_1 = \text{Avec}(I_1) + n_1$ for sensor 320-1 and (2) $y_2 = \text{Avec}(I_2) + n_2$ for sensor 320-2. In these equations, $\text{vec}(\cdot)$ vectorizes the scene $I_i$ inside ( ), A denotes the sensing matrix implemented by the programmable aperture 310 (where A $\in R^{M \times N}$), and $n_i$ signifies the associated noise. The reconstructed images $\hat{I}_1$ and $\hat{I}_2$ for the scenes $I_1$ and $I_2$ may be determined, using an image reconstruction process, based on the compressive measurements $y_1$ and $y_2$ captured by the sensors 320-1 and 320-2 for scenes $I_1$ and $I_2$, respectively.

The single-aperture multi-sensor lensless compressive camera 300 may be configured to reconstruct a 3D image of the real scene $I_0$. The reconstructed 3D image of the real scene $I_0$ includes the reconstructed images $\hat{I}_1$ and $\hat{I}_2$ determined based on the scenes $I_1$ and $I_2$ captured by the sensors 320-1 and 320-2 and depth information associated with a common portion of the reconstructed images $\hat{I}_1$ and $\hat{I}_2$ determined based on the scenes $I_1$ and $I_2$ captured by the sensors 320-1 and 320-2. The depth information includes, for each region of the common portion of the reconstructed images $\hat{I}_1$ and $\hat{I}_2$ determined based on the scenes $I_1$ and $I_2$ captured by sensors 320-1 and 320-2, an indication of a distance from the aperture programmable 310 to that region of the common portion of the reconstructed images $\hat{I}_1$ and $\hat{I}_2$. The granularity of the regions of the common portion of the reconstructed images $\hat{I}_1$ and $\hat{I}_2$ may be at a pixel level (e.g., distance information is determined for each pixel), at a group of pixels level (e.g., average distance is determined for each group of pixels), or the like, as well as various combinations thereof.

The depth information for the reconstructed 3D image of the real scene $I_0$ may be determined by identifying the common portion of the reconstructed images $\hat{I}_1$ and $\hat{I}_2$ and determining (or estimating) depth information associated with the common portion of the reconstructed images $\hat{I}_1$ and $\hat{I}_2$. The common portion of the reconstructed images $\hat{I}_1$ and $\hat{I}_2$ may be identified by using one or more matching algorithms (e.g., a block matching algorithm, a feature matching algorithm, or the like, as well as various combinations thereof) to identify corresponding points in the reconstructed images $\hat{I}_1$ and $\hat{I}_2$. The depth information for the reconstructed 3D image of the real scene $I_0$ may be determined based on the camera geometry information associated with the single-aperture multi-sensor lensless compressive camera 300 and disparity information associated with the common portion of the reconstructed images $\hat{I}_1$ and $\hat{I}_2$, both of which may be further understood by considering the geometrical analysis of single-aperture multi-sensor lensless compressive camera 300 which is discussed further below.

The depth information for the reconstructed 3D image of the real scene $I_0$, as noted above, may be determined based on the camera geometry information associated with single-aperture multi-sensor lensless compressive camera 300 and disparity information associated with the common portion of the reconstructed images $\hat{I}_1$ and $\hat{I}_2$. The manner in which the camera geometry information associated with the single-aperture multi-sensor lensless compressive camera 300 and disparity information associated with the common portion of the reconstructed images $\hat{I}_1$ and $\hat{I}_2$ may be used to determine the depth information for the reconstructed 3D image of the real scene $I_0$ may be further understood by considering the following geometrical analysis of the single-aperture multi-sensor lensless compressive camera 300. Consider two points in the real scene $I_0$ (denoted as A and B, with B being farther away from the programmable aperture 310 than A). The line segment $S_1B$ (representing a view of point B at first sensor 320-1) crosses the programmable aperture 310 at point $E_1$ and the line segment $S_1A$ (representing a view of point A at first sensor 320-1) crosses the aperture assembly at point $F_1$, such that $\{E_1, F_1\}$ are the projected points of $\{B, A\}$ on the programmable aperture 310 according to the first sensor 320-1. Similarly, line segment $S_2B$ (representing a view of point B at second sensor 320-2) crosses the programmable aperture 310 at point $E_2$ and the line segment $S_2A$ (representing a view of point A at second sensor 320-2) crosses the aperture assembly at point $F_2$, such that that $\{E_2, F_2\}$ are the projected points of $\{B, A\}$ on the programmable aperture 310 according to the second sensor 320-2. The line $\overline{AB}$ crosses the aperture at point D and intersects the sensor plane of the sensors 320 at point $S_0$, where $\overline{DS_0}$ and where $\overline{S_1S_2}$ are perpendicular. The depths of points A and B may be denoted as the length of line segment $\overline{AD}$ and the length of line segment $\overline{BD}$, respectively. The problem of finding the lengths of line segments $\overline{AD}$ and $\overline{BD}$ may be formulated as: given the lengths $\overline{S_1S_2}$ (i.e., the inter-sensor distance between sensor 320-1 and 320-2) and $\overline{DS_0}$ (i.e., the depth of the sensor plane as measured from the programmable aperture 310) and given the points $\{E_1, F_1, E_2, F_2\}$, determine (or estimate) the lengths of line segments AD and BD associated with points A and B. For point A, from $[[\overline{AD}/(\overline{AD}+\overline{DS_0})]=[\overline{F_1F_2}/\overline{S_1S_2}]]$, it may be shown that $\overline{AD}=[(\overline{F_1F_2} \cdot \overline{DS_0})(\overline{S_1S_2}-\overline{F_1F_2})]$. Similarly, for point B, from $[[\overline{BD}/(\overline{BD}+\overline{DS_0})]=[\overline{E_1E_2}/\overline{S_1S_2}]]$, it may be shown that $\overline{BD}=[(\overline{E_1E_2} \cdot \overline{DS_0})/(\overline{S_1S_2}-\overline{E_1E_2})]$. Accordingly, it may be seen that the depth of points A and B may be determined based on (1) $\overline{DS_0}$ and $\overline{S_1S_2}$ (i.e., camera geometry information, where $\overline{DS_0}$ is the depth of the sensor plane as measured from the programmable aperture 310 and $\overline{S_1S_2}$ is the inter-sensor distance between sensor 320-1 and 320-2) and (2) $\overline{F_1F_2}$ (for point A) and $\overline{E_1E_2}$ (for point B), where $\overline{F_1F_2}$ (for point A) and $\overline{E_1E_2}$ (for point B) may be determined from disparity information associated with the common portion of the reconstructed images $\hat{I}_1$ and $\hat{I}_2$.

It is noted that the above formulations may be represented more generally, for an arbitrary point P in the scene where the crossing points to the imaging plane of the programmable aperture 310 are {M1, M2}, by representing the distance $\overline{PS_0}$ as $\overline{PS_0}=\overline{PD}+\overline{DS_0}=[((\overline{M_1M_2} \cdot \overline{DS_0})/(\overline{S_1S_2}-\overline{M_1M_2}))+\overline{DS_0}]=[((\overline{S_1S_2}/(\overline{S_1S_2}-\overline{M_1M_2}))(\overline{DS_0})]$. This more general formulation of the depth for an arbitrary point P in a scene may be used to illustrate various differences between 3D image reconstruction based on lensless compressive image acquisition of a lensless compressive camera and a traditional camera that uses a lens. For example, $\overline{DS_0}$ in the lensless compressive camera may be used in place of f in the traditional camera. Additionally, for example, the center of S1 and S2 are the same in the lensless compressive camera, whereas they are displaced to left (L) and right (R) in the traditional camera. Additionally, for example, when the two images are obtained (reconstructed) by the lensless compressive camera then the two images can be superimposed, whereas when the two images are obtained (captured) by the traditional camera then the two images must be put center-to-center. This last point leads to the fact that the disparity map for the lensless compressive camera (given by $\overline{M_1M_2}$) is proportional to the depth for the lensless compressive camera, whereas the disparity map for the traditional camera (given by $LM_1+RM_2$) is inversely proportional to the depth for the lensless compressive camera. This may be seen from the fact that, as noted above, the center of S1 and S2 are the same in the lensless compressive camera, whereas they are displaced to left (L) and right (R) in the traditional camera.

The depth information for the reconstructed 3D image of real scene $I_0$, as noted above, may be determined based on camera geometry information associated with the single-aperture multi-sensor lensless compressive camera 300 and based on disparity information associated with the common portion of the reconstructed images $\hat{I}_1$ and $\hat{I}_2$. The disparity information associated with the common portion of the reconstructed images $\hat{I}_1$ and $\hat{I}_2$ may be determined based on one or more matching algorithms which may be used to identify the common portion of reconstructed images $\hat{I}_1$ and $\hat{I}_2$ (e.g., a block matching algorithm, a feature matching algorithm, or the like, as well as various combinations thereof). Here, disparity may refer to the distance between two corresponding points in a pair of stereo images (in the geometrical analysis of FIG. 3, as noted above, this corresponds to $\overline{F_1F_2}$ for point A and $\overline{E_1E_2}$ for point B). It is noted that since lensless compressive image acquisition is used to generate reconstructed images $\hat{I}_1$ and $\hat{I}_2$, at each region of the common portion of reconstructed images $\hat{I}_1$ and $\hat{I}_2$, the disparity at that region of the common portion of reconstructed images $\hat{I}_1$ and $\hat{I}_2$ is proportional to the depth at that region of the common portion of reconstructed images $\hat{I}_1$ and $\hat{I}_2$ and, as a result, the disparity information for the common portion of reconstructed images $\hat{I}_1$ and $\hat{I}_2$ is proportional to the depth information for the common portion of reconstructed images $\hat{I}_1$ and $\hat{I}_2$. This is unlike conventional camera systems in which disparity is inversely proportional to depth.

The depth information for the reconstructed 3D image of real scene $I_0$, as noted above, may be determined based on camera geometry information associated with the single-aperture multi-sensor lensless compressive camera 300 and based on disparity information associated with the common portion of the reconstructed images $\hat{I}_1$ and $\hat{I}_2$. The common portion of the reconstructed images $\hat{I}_1$ and $\hat{I}_2$ may be considered at various levels of granularity (e.g., per pixel, per group of pixels, or the like, as well as various combinations thereof). Accordingly, the disparity information associated with the common portion of the reconstructed images $\hat{I}_1$ and $\hat{I}_2$ and, similarly, the depth information associated with the common portion of the reconstructed images $\hat{I}_1$ and $\hat{I}_2$, may be determined and represented on a per-region basis where the regions may be sized in various ways. It is noted that, when determining and representing disparity information and depth information for the common portion of the reconstructed images $\hat{I}_1$ and $\hat{I}_2$, each region may be processed individually, groups of regions may be processed together (e.g., using image segmentation such that regions in the same depth only need to be computed once), or the like, as well as various combinations thereof.

It will be appreciated that the various types of image data and image-related data associated with reconstruction of a 3D image as discussed above may be handled (e.g., represented, stored, processed, or the like) in various ways. For example, the reconstructed images $\hat{I}_1$ and $\hat{I}_2$ may be maintained or represented as image data (e.g., values which represent the reconstructed images $\hat{I}_1$ and $\hat{I}_2$ and which may be processed to display the reconstructed images $\hat{I}_1$ and $\hat{I}_2$). For example, the disparity information for the common portion of the reconstructed images $\hat{I}_1$ and $\hat{I}_2$ may include or may be represented as disparity values for respective regions of the common portion of the reconstructed images $\hat{I}_1$ and $\hat{I}_2$, a disparity map associated with a depiction of common portion of the reconstructed images $\hat{I}_1$ and $\hat{I}_2$ (which may be displayed in independently or in conjunction with each other), or the like, as well as various combinations thereof. For example, the depth information for the common portion of the reconstructed images $\hat{I}_1$ and $\hat{I}_2$ may include or may be represented as depth values for respective regions of the common portion of the reconstructed images $\hat{I}_1$ and $\hat{I}_2$, a depth map associated with a depiction of common portion of the reconstructed images $\hat{I}_1$ and $\hat{I}_2$ (which may be displayed in independently or in conjunction with each other), or the like, as well as various combinations thereof. The various types of image data and image-related data associated with reconstruction of a 3D image may be handled (e.g., represented, stored, processed, or the like) in various ways.

Figure 4:
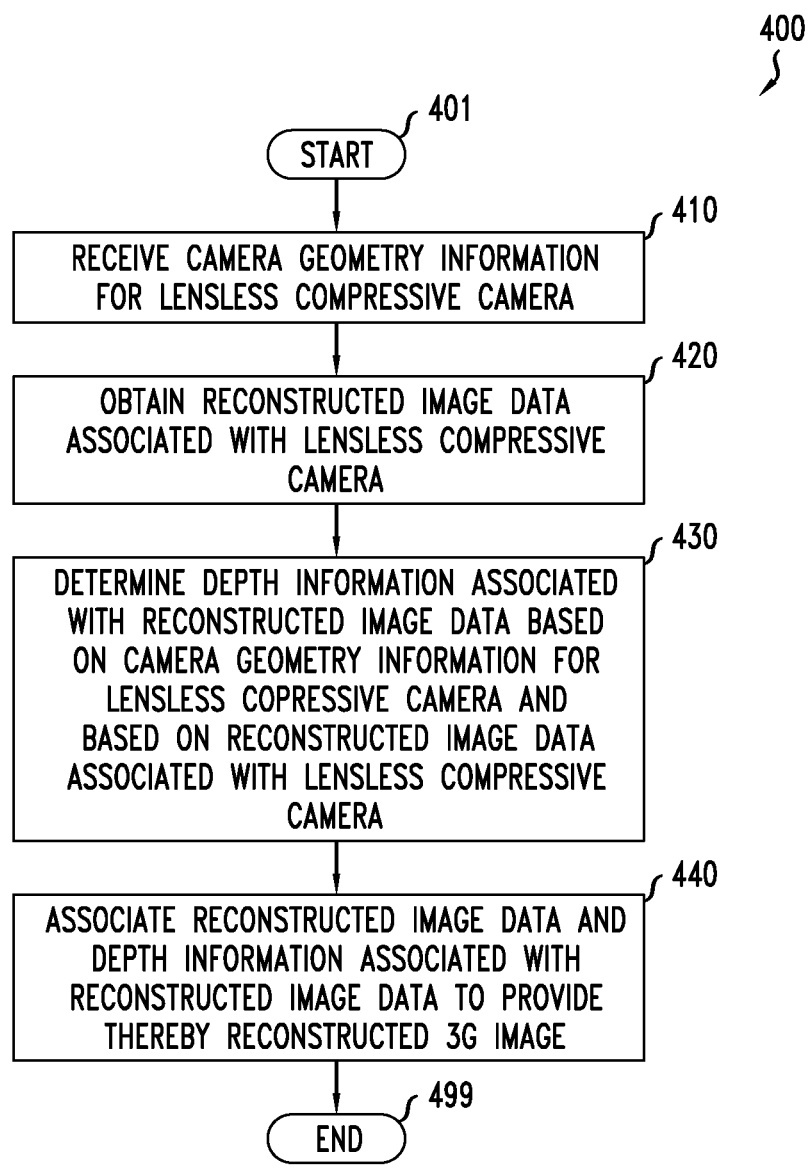
FIG. 4 depicts an embodiment of a method for performing 3D image reconstruction based on lensless compressive image acquisition by a lensless compressive camera.

FIG. 4 depicts an embodiment of a method for performing 3D image reconstruction based on lensless compressive image acquisition by a lensless compressive camera. It will be appreciated that the 3D image reconstruction may be performed by the lensless compressive camera, by a device that is communicatively connected to the lensless compressive camera (e.g., locally or remotely via a communication network), or the like, as well as various combinations thereof (e.g., such as where a portion of the functions are performed by the lensless compressive camera and a portion of the functions are performed by one or more other devices). It will be appreciated that, although the functions of method 400 are primarily presented herein as being performed serially, at least a portion of the functions of method 400 may be performed contemporaneously or in a different order than as presented in FIG. 4.

At block 401, method 400 begins.

At block 410, camera geometry information for the lensless compressive camera is received. The lensless compressive camera includes an aperture and a pair of sensors. The camera geometry information for the lensless compressive camera includes the inter-sensor distance between the pair of sensors and a distance between the aperture and sensor plane of the sensors. The camera geometry information for the lensless compressive camera may include other types of geometrical information associated with the design of the lensless compressive camera.

At block 420, reconstructed image data associated with the lensless compressive camera is obtained. The reconstructed image data includes (1) first reconstructed image data that is indicative of a first reconstructed image that is reconstructed based on compressive measurements associated with a first sensor in the pair of sensors of the lensless compressive camera and (2) second reconstructed image data that is indicative of a second reconstructed image that is reconstructed based on compressive measurements associated with a second sensor in the pair of sensors. The reconstructed image data may be obtained by receiving the reconstructed image data (e.g., where the reconstructed images of the sensors were reconstructed outside of the context of method 400), generating the reconstructed image data (e.g., where the reconstructed images of the sensors ware reconstructed within the context of method 400), or the like.

At block 430, depth information associated with the reconstructed image data is determined based on the camera geometry information for the lensless compressive camera and based on the reconstructed image data associated with the lensless compressive camera. The depth information is associated with a common portion of the reconstructed images of the image data. The depth information associated with the reconstructed image data may be determined by determining disparity information for a common portion of the reconstructed images of the reconstructed image data based on the reconstructed image data associated with the lensless compressive camera and determining the depth information associated with the reconstructed image data based on the disparity information for the common portion of the reconstructed images of the reconstructed image data and the camera geometry information for the lensless compressive camera. For example, at each region of the common portion of the reconstructed images (e.g., point or pixel, groups of points or pixels, or the like), the associated depth at that region of the common portion of the reconstructed images may be determined based on $[((\overline{S_1 S_2}/(\overline{S_1 S_2} - \overline{M_1 M_2}))(\overline{DS_0})]$.

At block 440, the reconstructed image data and the depth information associated with the reconstructed image data are associated to provide thereby the reconstructed 3D image (or at least the data representative of the reconstructed 3D image).

At block 499, method 400 ends.

It will be appreciated that various different functions depicted and described with respect to method 400 of FIG. 4 may be combined in various ways, distributed across various devices (including local devices having direct connections, remote devices configured to communicate over communication networks, or the like), or the like, as well as various combinations thereof.

Figure 7:
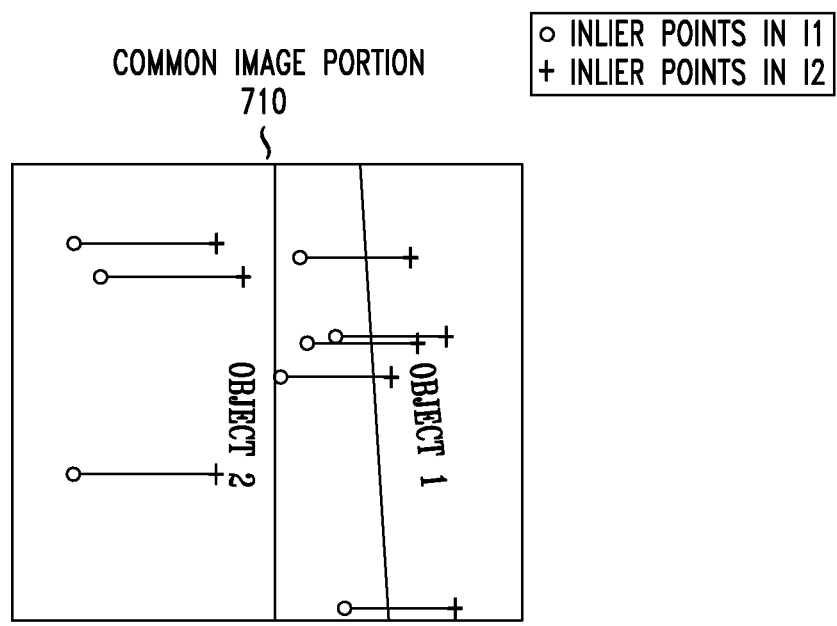
FIG. 7 depicts a common image portion of the two reconstructed images of FIG. 6.
Figure 8:
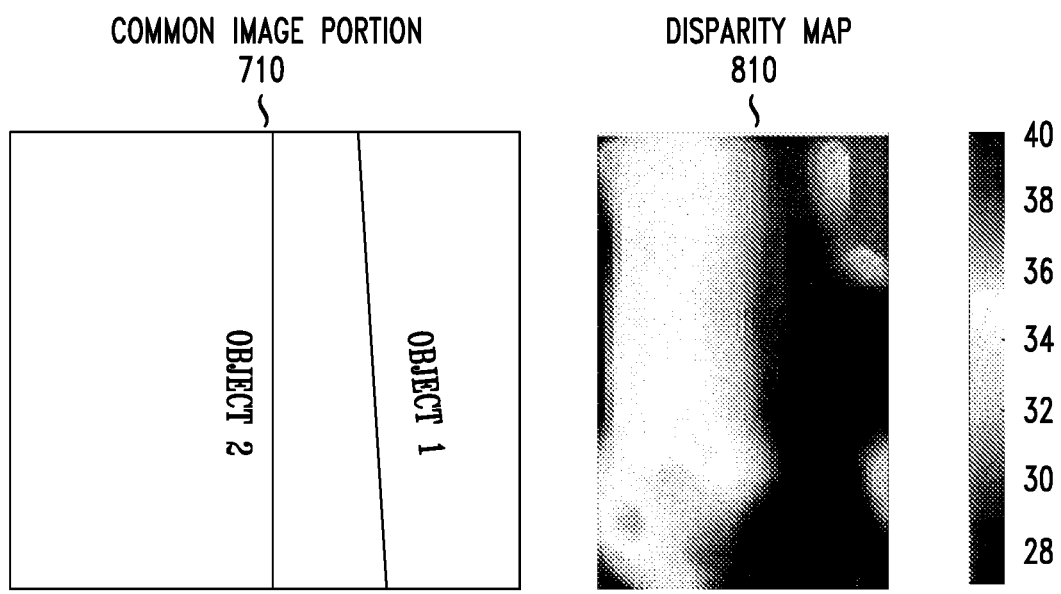
FIG. 8 depicts the common image portion of the two reconstructed images of FIG. 7 and a disparity map associated with the common image portion of the two reconstructed images.
Figure 9:
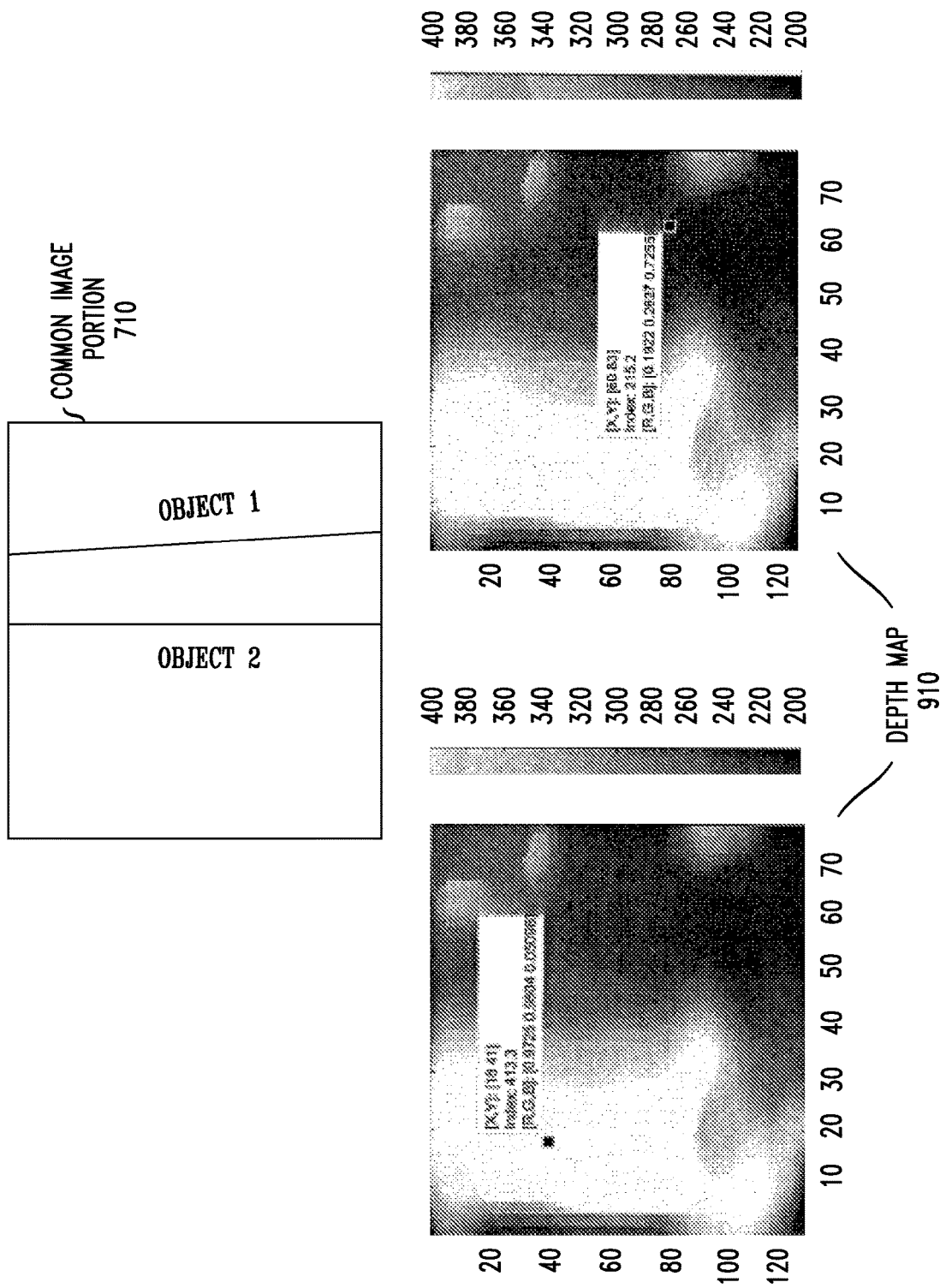
FIG. 9 depicts the common image portion of the two reconstructed images of FIG. 7 and a two distance maps associated with the common image portion of the two reconstructed images.

The reconstruction of a 3D image of a scene based on the 3D image reconstruction capability may be further understood by way of reference to the following example, which is presented with respect to FIGS. 5-9. In the example, a lensless compressive camera includes a programmable aperture and a pair of sensors. The lensless compressive camera and the scene to be captured by the lensless compressive camera are depicted in FIG. 5. FIG. 5 depicts a side view of an arrangement in which a lensless compressive camera 510 is set up to capture a scene including two objects. As depicted in FIG. 5, the scene is a two-layer scene, with a first object (labeled OBJECT 1) in the foreground closer to the lensless compressive camera 510 and a second object (labeled OBJECT 2) in the background farther from the lensless compressive camera 510. The lensless compressive camera 510 generates a pair of reconstructed images, reconstructed based on captured compressive measurements associated with the two respective sensors of the lensless compressive camera 510. FIG. 6 depicts the pair of reconstructed images 610, which includes a first reconstructed image 610-1 (which has been reconstructed based on captured compressive measurements associated with a first of the two sensors of the lensless compressive camera 510) and a second reconstructed image 610-2 (which has been reconstructed based on captured compressive measurements associated with a second of the two sensors of the lensless compressive camera 510). As depicted in FIG. 6, the first image 610-1 and the second image 610-2 represent different views of the scene associated with the two sensors of the lensless compressive camera 510 and, thus, are different. The programmable aperture of the lensless compressive camera 510 is programmed to a resolution of 128×128 and, thus, this is assumed to be the resolution of the reconstructed images 610 which are depicted in FIG. 6. A common portion of the reconstructed images is determined via match point detection and rectification. FIG. 7 depicts the overlapping portions of the reconstructed images 610 (labeled in FIG. 7 as the common image portion 710 of the reconstructed images 610). As depicted in FIG. 7, inlier points common to the reconstructed images 610 are identified in order to identify the overlapping portions of the reconstructed images 610 that form the common image portion 710 of the reconstructed images 610. The disparity information for the common image portion 710 of the reconstructed images 610 is estimated or inferred via a block matching algorithm. The disparity information may be represented as a disparity map associated with the common image portion 710 of the reconstructed images 610. FIG. 8 depicts the common image portion 710 of the reconstructed images 610 and the disparity map 810 associated with the common image portion 710 of the reconstructed images 610. In the disparity map 810 of FIG. 8, it may be observed that (1) the right part of the common image portion 710 of the reconstructed images 610 (corresponding to OBJECT 1) is close to the lensless compressive camera 510 and, thus, that the shifting pixel number is relatively small (i.e., <30) and (2) the left part of the common image portion 710 of the reconstructed images 610 (corresponding to OBJECT 2) is far from the lensless compressive camera 510 and, thus, that the shifting pixel number is relatively large (i.e., >35). From the disparity map 810 of FIG. 8, it may be seen that the disparity is proportional to depth from the lensless compressive camera 510. The depth of the common image portion 710 of the reconstructed images 610 may be determined based on the disparity map 810 of FIG. 8 and camera geometry information of the lensless compressive camera 510. For this example, assume that the parameters of the lensless compressive camera 510 are as follows: (1) the inter-sensor distance between the sensors is $\overline{S_1 S_2}$=1.9583 inches=49.74 mm, (2) the distance from the sensor board to the programmable aperture is $\overline{DS_0}$=7.5 inches=190.5 mm, and (3) each of the programmable elements on the programmable aperture is of size 1.3475 mm×0.9625 mm. The depth information for the common image portion 710 of the reconstructed images 610 may be computed as follows. The size of the programmable aperture is 9.7 inches, with a width of 3/5×9.7 inches=5.82 inches=147.8 mm and with a height of 4/5×9.7 inches=7.76 inches=197.1 mm. The resolution of the programmable aperture is 1024×768, with this example using a resolution of 896×640. The programmable elements of the programmable aperture are of size 0.1925 mm×0.1925 mm. When the programmable aperture resolution of 896×640 is merged to a resolution of 128×128, this results in an image pixel size of 1.3475 mm×0.9625 mm in the reconstructed images 610 depicted in FIG. 6 and, therefore, also of the common image portion 710 of the reconstructed images 610 depicted in FIG. 7. In this example, we consider only horizontal shifting and, thus, the pixel size of the common image portion 710 of the reconstructed images 610 that is depicted in FIG. 8 is 1.3475 mm. The disparity map 810 of FIG. 8 provides the values of $\overline{M_1M_2}$ in $\overline{PD}=[(\overline{M_1M_2} \cdot \overline{DS_0})/(\overline{S_1S_2}-\overline{M_1M_2})]$. Therefore, the depth information for the common image portion 710 of the reconstructed images 610 may be calculated, using this equation, based on the camera geometry information of the lensless compressive camera 510 and the disparity map 810. FIG. 9 depicts the common image portion 710 of the reconstructed images 610 and the depth map 910 associated with the common image portion 710 of the reconstructed images 610. As may be seen from FIG. 9, the common image portion 710 of the reconstructed images 610 and the depth map 910 associated with the common image portion 710 of the reconstructed images 610 provide a 3D reconstruction of the scene captured by lensless compressive camera 510 as shown in FIG. 5. It is noted that the depth map 910 is depicted twice in FIG. 9 to show details of two different points in the depth map 910.

It will be appreciated that, although primarily presented herein with respect to embodiments in which the lensless compressive camera includes two sensors for use in reconstructing 3D images of scenes, in at least some embodiments the lensless compressive camera may include more than two sensors for use in reconstructing 3D images of scenes. It will be appreciated that the use of additional sensors can increase the resolution of the common portion of the scene that is covered by the combination of the sensors that includes the additional sensors, increase the resolution of the disparity information that is determined for the common portion of the scene that is covered by the combination of the sensors that includes the additional sensors, increase the resolution of the depth information for the common portion of the scene that is covered by the combination of the sensors that includes the additional sensors. It also will be appreciate that use of one or more additional sensors may result in multiple areas of overlap having multiple levels of resolution therewith. This may be further understood by considering a relatively simple case of the use of one additional sensor, such that three sensors are used for 3D image reconstruction (denoted as a first sensor, a second sensor, and a third sensor). Here, given the use of three sensors, there will be four different common portion of the scene as follows: (1) a common portion resulting from overlay of the two reconstructed 2D images from the first sensor and the second sensor, (2) a common portion resulting from overlay of the two reconstructed 2D images from the first sensor and the third sensor, (3) a common portion resulting from overlay of the two reconstructed 2D images from the second sensor and the third sensor, and (4) a common portion resulting from overlay of the three reconstructed 2D images from the first sensor, the second sensor, and the third sensor. Thus, there will also be multiple sets of disparity information associated with the multiple common portions of the scene, multiple sets of depth information associated with the multiple common portions of the scene, or the like, as well as various combinations thereof. For example, the disparity information may include (1) disparity information for a common portion associated with the first sensor and the second sensor, (2) disparity information for a common portion associated with the first sensor and the third sensor, (3) disparity information for a common portion associated with the second sensor and the third sensor, and (4) disparity information for a common portion associated with the first sensor, the second sensor, and the third sensor. Similarly, for example, the depth information may include (1) depth information for a common portion associated with the first sensor and the second sensor, (2) depth information for a common portion associated with the first sensor and the third sensor, (3) depth information for a common portion associated with the second sensor and the third sensor, and (4) depth information for a common portion associated with the first sensor, the second sensor, and the third sensor.

Various embodiments of the 3D image reconstruction capability may provide various advantages or potential advantages. Various embodiments of the 3D image reconstruction capability, being based on lensless compressive image acquisition, may provide a low power, low cost mechanism for enabling reconstruction of 3D images of a scene. Various embodiments of the 3D image reconstruction capability may provide a low bandwidth mechanism for enabling reconstruction of 3D images of a scene, which may make use of lensless compressive image acquisition for providing 3D image reconstruction beneficial in various contexts (e.g., Internet-of-Things (IoT) environments or the like). Various embodiments of the 3D image reconstruction capability, being based on lensless compressive image acquisition, may obviate the need for use of multiple camera or even a single complex camera in order to obtain 3D images of a scene; rather, various embodiments of the 3D image reconstruction capability enable reconstruction of 3D images of a scene using an aperture assembly and two sensors. Various embodiments of the 3D image reconstruction capability may provide various other advantages or potential advantages.

Figure 10:
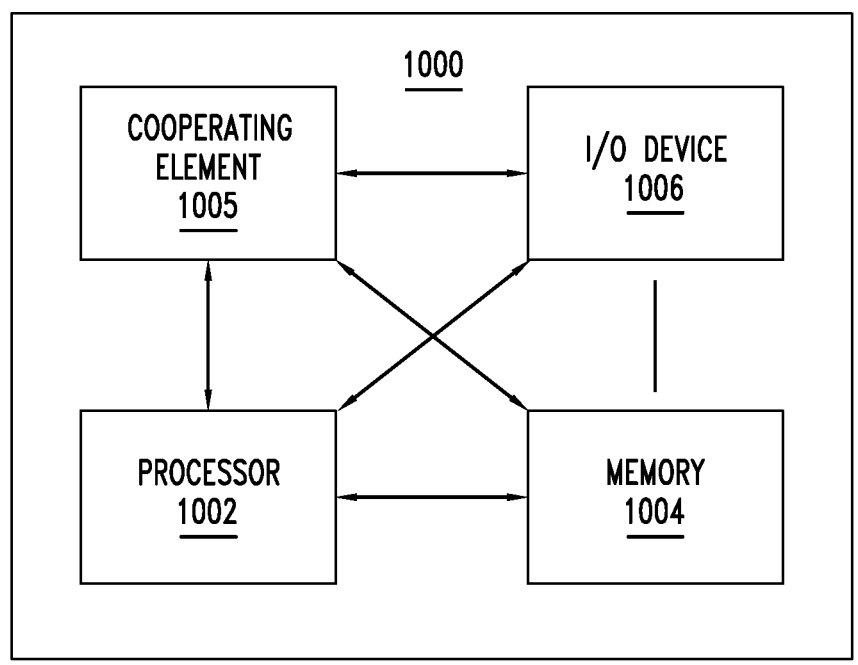
FIG. 10 depicts a high-level block diagram of a computer suitable for use in performing various functions presented herein.

FIG. 10 depicts a high-level block diagram of a computer suitable for use in performing various functions described herein.

The computer 1000 includes a processor 1002 (e.g., a central processing unit (CPU), a processor having a set of processor cores, a processor core of a processor, or the like) and a memory 1004 (e.g., a random access memory (RAM), a read only memory (ROM), or the like). The processor 1002 and the memory 1004 are communicatively connected.

The computer 1000 also may include a cooperating element 1005. The cooperating element 1005 may be a hardware device. The cooperating element 1005 may be a process that can be loaded into the memory 1004 and executed by the processor 1002 to implement functions as discussed herein (in which case, for example, the cooperating element 1005 (including associated data structures) can be stored on a non-transitory computer-readable storage medium, such as a storage device or other storage element (e.g., a magnetic drive, an optical drive, or the like)).

The computer 1000 also may include one or more input/output devices 1006. The input/output devices 1006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1000 of FIG. 10 may represent a general architecture and functionality suitable for implementing functional elements described herein, portions of functional elements described herein, or the like, as well as various combinations thereof. For example, computer 1000 may provide a general architecture and functionality that is suitable for implementing single-aperture multi-sensor lensless compressive image acquisition system 100, a portion of single-aperture multi-sensor lensless compressive image acquisition system 100, a device including single-aperture multi-sensor lensless compressive image acquisition system 100, a device that is configured to support or perform 3D image reconstruction processing based on data and information from multi-sensor lensless compressive image acquisition system 100, or the like.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
receive camera geometry information associated with a lensless compressive camera comprising a programmable aperture and a sensor plane including a pair of sensors, wherein the camera geometry information comprises an inter-sensor distance between the sensors and a distance between the programmable aperture and the sensor plane;
obtain reconstructed image data indicative of a pair of reconstructed images reconstructed based on respective sets of compressive measurements associated with the respective pair of sensors;
determine, based on the reconstructed image data, disparity information associated with a common image portion that is common to the pair of reconstructed images; and
determine, based on the camera geometry information and the disparity information associated with the common image portion, depth information associated with the common image portion.

2. The apparatus of claim 1, wherein the processor is configured to:
associate the reconstructed image data and the depth information to provide thereby a reconstructed three-dimensional (3D) image.

3. The apparatus of claim 1, wherein the camera geometry information further comprises an element size associated with programmable elements of the programmable aperture.

4. The apparatus of claim 1, wherein, to obtain the reconstructed image data, the processor is configured to: receive the reconstructed image data from a storage device.

5. The apparatus of claim 4, wherein the processor is configured to receive the reconstructed image data from the storage device via a communication network.

6. The apparatus of claim 1, wherein, to obtain the reconstructed image data, the processor is configured to:
receive a first set of compressive measurements associated with a first sensor of the pair of sensors and generate, based on the first set of compressive measurements, first reconstructed image data indicative of a first reconstructed image of the pair of reconstructed images; and
receive a second set of compressive measurements associated with a second sensor of the pair of sensors and generate, based on the second set of compressive measurements, second reconstructed image data indicative of a second reconstructed image of the pair of reconstructed images.

7. The apparatus of claim 6, wherein the processor is configured to receive the first set of compressive measurements and the second set of compressive measurements from the lensless compressive camera via a communication network.

8. The apparatus of claim 1, wherein the processor is configured to:
identify the common image portion that is common to the pair of reconstructed images.

9. The apparatus of claim 8, wherein, to identify the common image portion, the processor is configured to:
process the pair of reconstructed images, based on at least one of a block matching algorithm or a feature matching algorithm, to identify the common image portion.

10. The apparatus of claim 1, wherein the depth information associated with the common image portion is proportional to the disparity information associated with the common image portion.

11. The apparatus of claim 1, wherein, to determine the depth information associated with the common image portion, the processor is configured to:
for each of a plurality of regions of the common image portion:
determine, from the disparity information associated with the common image portion, a disparity value associated with the region of the common image portion; and
determine a depth value associated with the region of the common image portion based on the camera geometry information and the disparity value associated with the region of the common image portion.

12. The apparatus of claim 11, wherein the region of the common image portion comprise a pixel or a group of pixels.

13. The apparatus of claim 11, wherein the processor is configured to determine the depth value associated with the region of the common image portion based on $\overline{PD}=[(\overline{M_1M_2}\ \overline{DS_0})/(\overline{S_1S_2}-\overline{M_1M_2})]$, wherein $\overline{PD}$ is the depth value, $\overline{M_1M_2}$ is the disparity value, $\overline{S_1S_2}$ is the inter-sensor distance between the sensors, and $\overline{DS_0}$ is the distance between the programmable aperture and the sensor plane.

14. The apparatus of claim 1, wherein the apparatus forms part of the lensless compressive camera.

15. The apparatus of claim 1, wherein the apparatus is configured to communicate with the lensless compressive camera via a communication network or is configured to form part of a device configured to communicate with the lensless compressive camera via a communication network.

16. A method, comprising:
   receiving, by a processor, camera geometry information associated with a lensless compressive camera comprising a programmable aperture and a sensor plane including a pair of sensors, wherein the camera geometry information comprises an inter-sensor distance between the sensors and a distance between the programmable aperture and the sensor plane;
   obtaining, by the processor, reconstructed image data indicative of a pair of reconstructed images reconstructed based on respective sets of compressive measurements associated with the respective pair of sensors;
   determining, by the processor based on the reconstructed image data, disparity information associated with a common image portion that is common to the pair of reconstructed images; and
   determining, by the processor based on the camera geometry information and the disparity information associated with the common image portion, depth information associated with the common image portion.

17. A lensless compressive camera, comprising:
   a programmable aperture;
   a pair of sensors disposed on a sensor plane and configured to detect light passing through the programmable aperture;
   a memory configured to store camera geometry information associated with the lensless compressive camera, wherein the camera geometry information comprises an inter-sensor distance between the sensors and a distance between the programmable aperture and the sensor plane; and
   a processor configured to:
      determine reconstructed image data indicative of a pair of reconstructed images reconstructed based on respective sets of compressive measurements associated with the respective pair of sensors of the lensless compressive camera;
      determine, based on the reconstructed image data, disparity information associated with a common image portion that is common to the pair of reconstructed images; and
      determine, based on the camera geometry information and the disparity information associated with the common image portion, depth information associated with the common image portion.

* * * * *